(12) United States Patent
Zhong et al.

(10) Patent No.: US 9,684,195 B2
(45) Date of Patent: Jun. 20, 2017

(54) MANUFACTURE METHOD OF FLEXIBLE LIQUID CRYSTAL PANEL AND FLEXIBLE LIQUID CRYSTAL PANEL

(71) Applicant: Shenzhen China Star Optoelectronics Technology Co., Ltd., Shenzhen, Guangdong (CN)

(72) Inventors: Xinhui Zhong, Guangdong (CN); Yungjui Lee, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 326 days.

(21) Appl. No.: 14/423,425

(22) PCT Filed: Feb. 6, 2015

(86) PCT No.: PCT/CN2015/072363
§ 371 (c)(1),
(2) Date: Feb. 23, 2015

(87) PCT Pub. No.: WO2016/074351
PCT Pub. Date: May 19, 2016

(65) Prior Publication Data
US 2016/0342009 A1    Nov. 24, 2016

(30) Foreign Application Priority Data
Nov. 12, 2014  (CN) .......................... 2014 1 0635758

(51) Int. Cl.
*G02F 1/1334*  (2006.01)
*G02F 1/1333*  (2006.01)
(Continued)

(52) U.S. Cl.
CPC ...... *G02F 1/133305* (2013.01); *G02F 1/1334* (2013.01); *G02F 1/1339* (2013.01);
(Continued)

(58) Field of Classification Search
CPC .................. G02F 1/1334; G02F 1/133305
See application file for complete search history.

(56) References Cited

U.S. PATENT DOCUMENTS

| 2007/0002214 A1* | 1/2007 | Sasabayashi | ......... G02F 1/1334 349/88 |
| 2012/0088320 A1* | 4/2012 | Hwang | ............ B29D 11/00788 438/27 |

(Continued)

FOREIGN PATENT DOCUMENTS

| CN | 102511017 A | 6/2012 |
| CN | 103913880 A | 7/2014 |

*Primary Examiner* — Kendrick Hsu
(74) *Attorney, Agent, or Firm* — Andrew C. Cheng

(57) ABSTRACT

The present invention provides a manufacture method of a flexible liquid crystal panel and a flexible liquid crystal panel. The manufacture method of the flexible liquid crystal panel first manufactures comb pixel electrodes (11), gate lines, data lines, TFTs and a color filter layer on a first flexible substrate (1); continuously coats a mixture of sealant (51') and liquid crystal micro capsules (53) on a flexible carrier (30) in roll-to-roll, and meanwhile implements UV irradiation to the sealant (51') for occurring polyreaction and solidification to become a polymeric layer (51), and the liquid crystal micro capsules (53) are distributed in the polymeric layer (51) to acquire a polymer/liquid crystal mixture layer (5); cuts a composite layer of the flexible carrier (30) and the polymer/liquid crystal mixture layer (5) to obtain a second flexible substrate (3); then, laminates the first flexible substrate (1) and the second flexible substrate (3); finally, laminates an upper polarizer (9) and a lower polarizer (7).

7 Claims, 9 Drawing Sheets

(51) Int. Cl.
*G02F 1/1335* (2006.01)
*G02F 1/1339* (2006.01)
*G02F 1/1343* (2006.01)
*G02F 1/1368* (2006.01)
*G02F 1/1362* (2006.01)

(52) U.S. Cl.
CPC ........ *G02F 1/1368* (2013.01); *G02F 1/13439* (2013.01); *G02F 1/133528* (2013.01); *G02F 1/134309* (2013.01); *G02F 2001/133354* (2013.01); *G02F 2001/136222* (2013.01); *G02F 2001/136295* (2013.01); *G02F 2201/124* (2013.01)

(56) References Cited

U.S. PATENT DOCUMENTS

2015/0109547 A1* 4/2015 Kim ................... G02F 1/1368
    349/12
2016/0062175 A1* 3/2016 Jeon ................. G02F 1/133377
    349/43

\* cited by examiner

MANUFACTURE METHOD OF FLEXIBLE LIQUID CRYSTAL PANEL AND FLEXIBLE LIQUID CRYSTAL PANEL

FIELD OF THE INVENTION

The present invention relates to a display technology field, and more particularly to a manufacture method of a flexible liquid crystal panel and a flexible liquid crystal panel.

BACKGROUND OF THE INVENTION

With the gradual population of wearable application equipments, such as smart glasses, smart phone, et cetera, the demands to flexible display in the display industry have constantly increased.

An Organic Light Emitting Diodes Display (OLED) possesses properties of self-illumination, no required back light, being ultra thin, wide view angle, fast response and etc., and accordingly has the nature advantage of flexible display. However, the OLED industry remains the extremely high bar of technology. The difficulty of the manufacture process is high. The yield is low and the cost is high. These drawbacks get in way of wide applications of the OLED.

The Liquid Crystal Display (LCD) is the most widely used display product in the present market. The production technology is quite mature. The yield of the production is high. The cost is relatively low and the acceptance is high in the market.

Normally, the liquid crystal display comprises a shell, a liquid crystal display panel located in the shell and a backlight module located in the shell. The liquid crystal panel comprises a Color Filter (CF), a Thin Film Transistor Array Substrate (TFT Array Substrate) and a Liquid Crystal Layer filled between the two substrates. Transparent electrodes are formed at the inner side of the CF substrate and the TFT substrate. The liquid crystal display performs control to the orientation of the liquid crystal molecules in the liquid crystal layer with an electric field to change the polarization state of the light. The objective of display is achieved with the polarizer to realize the transmission and the obstruction of the optical path.

FIG. 1 is a structural diagram of a liquid crystal panel according to prior art in plane state. The liquid crystal material in the liquid crystal layer 300 is fluid which is flowable. The TFT substrate 100 and the CF substrate 200 are supported by the Photo Spacers (PS) 400 between the two substrates to maintain the Cell Gap and the Cell Gap evenness of the liquid crystal layer 300. In general conditions, the liquid crystal panel shown in FIG. 1 can satisfy the display evenness demands when the present liquid crystal panel in a plane state. The Cell Gap of the liquid crystal layer 300 is kept around the design value, and the Cell Gap is more even. However, after the liquid crystal panel previously in the plane state is bent, as shown in FIG. 2, the liquid crystal panel in a curved state suffers different stresses at various positions. The stress is larger where the curvature is larger. Consequently, the heights of the Photo Spacers 400 at various positions between the TFT substrate 100 and the CF substrate 200 are different. Meanwhile, the liquid crystal material in the liquid crystal layer 300 is pressed and flowing. Ultimately, it results in the uneven Cell Gap at various position of the liquid crystal layer 300.

The common liquid crystal panels in the main market can be categorized in three types, which respectively are Twisted Nematic/Super Twisted Nematic (TN/STN) types, In-Plane Switch (IPS) type and Vertical Alignment (VA) type. Although the principles of liquid crystal display adjustment are different, the basic structures of these three type liquid crystal panels are relatively similar. The display property and the Cell Gap of the liquid crystal layer are closely related. Whether the Cell Gap of the liquid crystal layer is even has the direct influence on the display effect. Changing the Cell Gap of the liquid crystal layer will affect the display brightness, contrast, response speed, etc. of the liquid crystal panel. Therefore, improvement is necessary to the traditional liquid crystal panel to solve the issue of uneven Cell Gap caused by the bent liquid crystal layer for allowing the liquid crystal panel adaptable for flexible display.

SUMMARY OF THE INVENTION

An objective of the present invention is to provide a manufacture method of a flexible liquid crystal panel, which can eliminate the issue of the uneven cell gap in a liquid crystal layer of a bent liquid crystal panel according to prior art, allow the liquid crystal panel adaptable for flexible display and promote the efficiency of the manufacture process.

Another objective of the present invention is to provide a flexible liquid crystal panel to prevent the occurrence of large area flow of liquid crystal material, which can eliminate the issue of the uneven cell gap in a liquid crystal layer of a bent liquid crystal panel according to prior art, and allow the liquid crystal panel adaptable for flexible display.

For realizing the aforesaid objectives, the present invention provides a manufacture method of a flexible liquid crystal panel, comprising first manufacturing comb pixel electrodes, gate lines, data lines, TFTs and a color filter layer on a first flexible substrate; continuously coating a mixture of sealant and liquid crystal micro capsules on a flexible carrier in roll-to-roll, and meanwhile implementing UV irradiation to the sealant for occurring polyreaction and solidification to become a polymeric layer, wherein the liquid crystal micro capsules are distributed in the polymeric layer to acquire a polymer/liquid crystal mixture layer; cutting a composite layer of the flexible carrier and the polymer/liquid crystal mixture layer to obtain a second flexible substrate; then, laminating the first flexible substrate and the second flexible substrate; finally, laminating an upper polarizer and a lower polarizer.

The manufacture method of the flexible liquid crystal panel comprises steps of:

step 1, providing the first flexible substrate and laminating the first flexible substrate to a glass;

step 2, manufacturing the comb pixel electrodes, the gate lines, the data lines, the TFTs and the color filter layer on the first flexible substrate by a microlithography process, and then removing the glass;

step 3, providing a flexible carrier, positioning the flexible carrier on a delivery wheel of a roll-to-roll equipment, and two ends of the flexible carrier are respectively rolled to two roll shafts of the roll-to-roll equipment, and a slit nozzle is vertically located right above the flexible carrier, and a UV lamp, which is parallel with the flexible carrier is located at one side of the slit nozzle;

step 4, driving the roll shafts and the delivery wheel to rotate the flexible carrier to move along with the slit nozzle toward the UV lamp, and from one roll shaft to the other roll shaft, and continuously coating the mixture of the sealant and the liquid crystal micro capsules on the flexible carrier via the slit nozzle, and meanwhile, implementing UV irradiation with the UV lamp to the sealant for occurring polyreaction and solidification to become a polymeric layer, and the liquid crystal micro capsules are distributed in the polymeric layer to acquire a polymer/liquid crystal mixture layer;

the sealant contains polymeric monomers; the liquid crystal micro capsule comprises a hard shell and a plurality of liquid crystal molecules wrapped in the hard shell;

step 5, cutting the composite layer of the flexible carrier and the polymer/liquid crystal mixture layer to obtain the second flexible substrate, and a dimension of the second flexible substrate is adaptable for a dimension of the first flexible substrate;

step 6, laminating the first flexible substrate and the second flexible substrate to package the polymer/liquid crystal mixture layer between the first flexible substrate and the second flexible substrate;

step 7, laminating a lower polarizer on a lower surface of the first flexible substrate, and laminating an upper polarizer on an upper surface of the second flexible substrate;

the axis directions of the upper polarizer and the lower polarizer are mutually perpendicular, and respectively tilted relative to the comb pixel electrodes.

The first flexible substrate is a plastic substrate, and the flexible carrier is a plastic carrier, and the second flexible substrate is a plastic substrate.

The comb pixel electrodes are alternately spaced and aligned on the horizontal direction.

The liquid crystal micro capsules appear to be spherical, and the diameters are 20 nm-200 nm. The axis directions of the upper polarizer and the lower polarizer respectively form a 45 degree include angle and a 135 degree included angle with the comb pixel electrodes.

The polymeric monomer is one or a combination of acrylate and derivatives thereof, methacrylate and derivatives thereof, styrene and derivatives thereof, epoxy resin and aliphatics epoxy curing agent.

The present invention further provides a flexible liquid crystal panel, comprising a first flexible substrate, a second flexible substrate oppositely located to the first flexible substrate, a polymer/liquid crystal mixture layer located between the first flexible substrate and the second flexible substrate, a lower polarizer located at a lower surface of the first flexible substrate and an upper polarizer located at a upper surface of the second flexible substrate;

comb pixel electrodes, gate lines, data lines, TFTs and a color filter layer formed on the first flexible substrate;

whrein the polymer/liquid crystal mixture layer comprises a polymeric layer and liquid crystal micro capsules distributed in the polymeric layer; the liquid crystal micro capsule comprises a hard shell and a plurality of liquid crystal molecules wrapped in the hard shell;

the axis directions of the upper polarizer and the lower polarizer are mutually perpendicular, and respectively tilted relative to the comb pixel electrodes.

The first flexible substrate is a plastic substrate, and the second flexible substrate is a plastic substrate.

The liquid crystal micro capsules appear to be spherical, and the diameters are 20 nm-200 nm.

The comb pixel electrodes are alternately spaced and aligned on the horizontal direction; the axis directions of the upper polarizer and the lower polarizer respectively form a 45 degree include angle and a 135 degree included angle with the comb pixel electrodes.

The benefits of the present invention are: the present invention provides a manufacture method of a flexible liquid crystal panel, continuously coating a mixture of sealant and liquid crystal micro capsules in roll-to-roll, and meanwhile implementing UV irradiation to the sealant for occurring polyreaction and solidification to become a polymeric layer, and the liquid crystal micro capsules are distributed in the polymeric layer to acquire a polymer/liquid crystal mixture layer. The liquid crystal molecules are surrounded by the polymeric layer in a form of liquid crystal micro capsule, and different liquid crystal micro capsules are independent among one another. Therefore, the large area flow of liquid crystal material will not occur, which can eliminate the issue of the uneven cell gap in a liquid crystal layer of a bent liquid crystal panel according to prior art, allow the liquid crystal panel adaptable for flexible display and promote the efficiency of the manufacture process. The flexible liquid crystal panel provided by the present invention comprises the polymer/liquid crystal mixture layer, and the liquid crystal molecules are surrounded by the polymeric layer in the form of liquid crystal micro capsule, and different liquid crystal micro capsules are independent among one another. Therefore, the large area flow of liquid crystal material will not occur, which can eliminate the issue of the uneven cell gap in a liquid crystal layer of a bent liquid crystal panel according to prior art, and allow the liquid crystal panel adaptable for flexible display.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
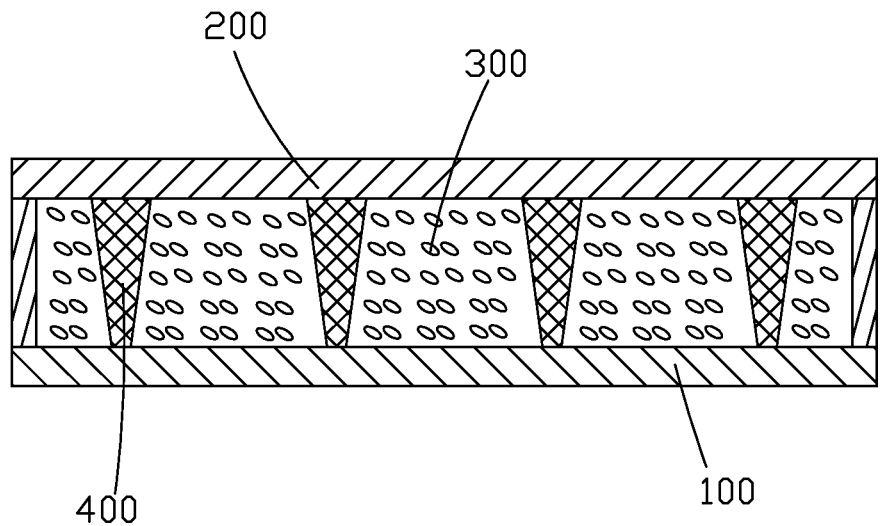
FIG. 1 is a structural diagram of a liquid crystal panel according to prior art in plane state.
Figure 2:
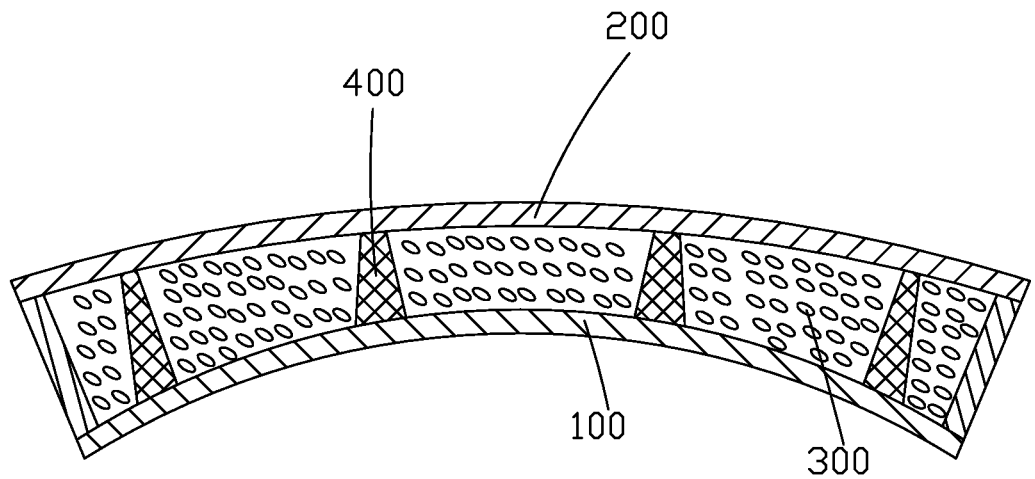
FIG. 2 is a structural diagram of a liquid crystal panel according to prior art in curved state.
Figure 3:
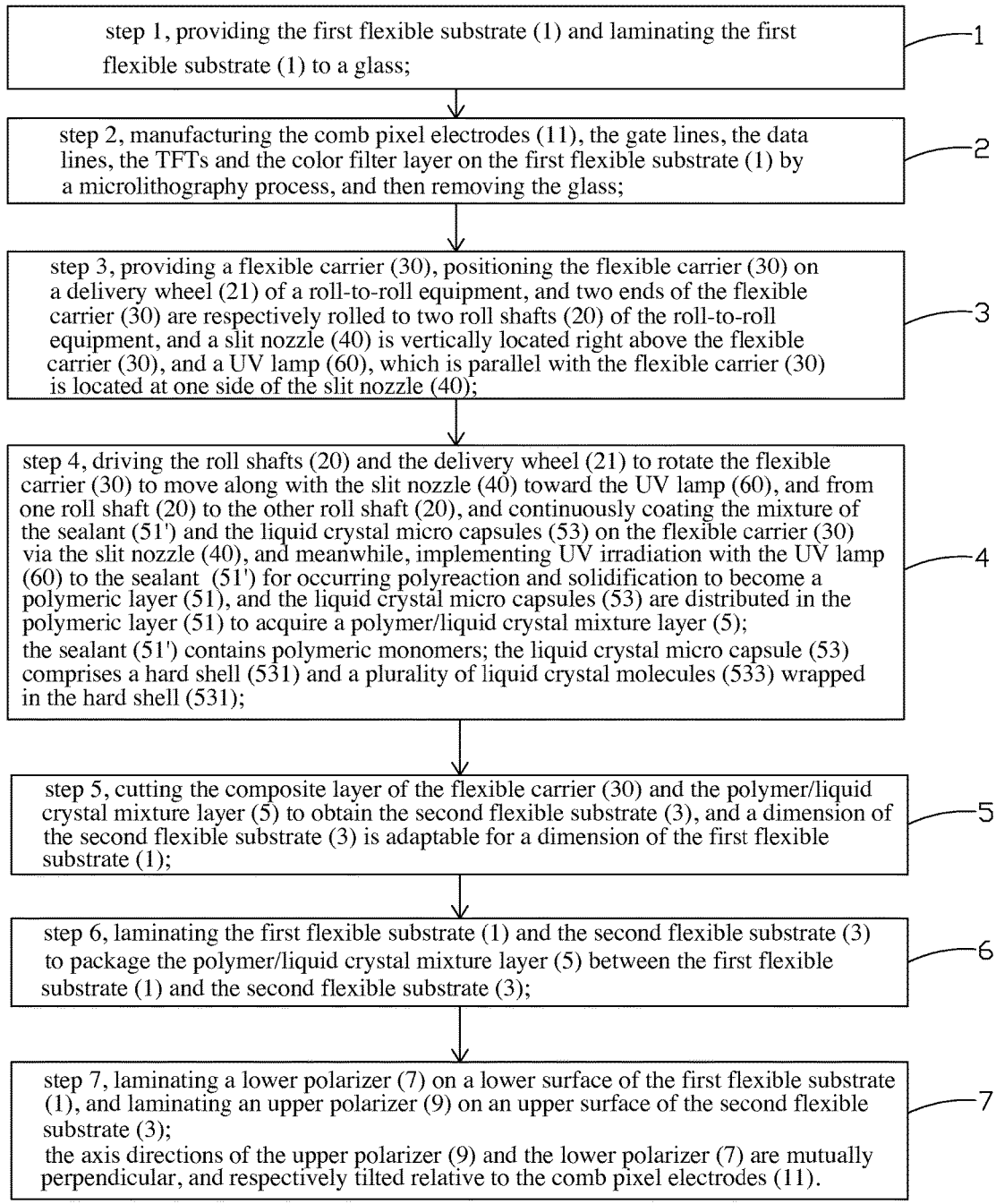
FIG. 3 is a flowchart of a manufacture method of a flexible liquid crystal panel according to the present invention.

Please refer to FIG. 3. The present invention provides a manufacture method of a flexible liquid crystal panel, comprising steps of:

step 1, providing the first flexible substrate 1 and laminating the first flexible substrate 1 to a glass.

The first flexible substrate 1 is transparent and flexible. Preferably, the first flexible substrate 1 is a plastic substrate. Lamination of the first flexible substrate 1 with the glass can ensure the first flexible substrate 1 is throughout in plane state in the microlithography process of the following step 2 which is better for implementing the microlithography process.

step 2, manufacturing the comb pixel electrodes 11, the gate lines, the data lines, the TFTs and the color filter layer on the first flexible substrate 1 by a microlithography process, i.e. the first flexible substrate 1 is equivalent to a TFT substrate located with the color filter layer.

Figure 4:
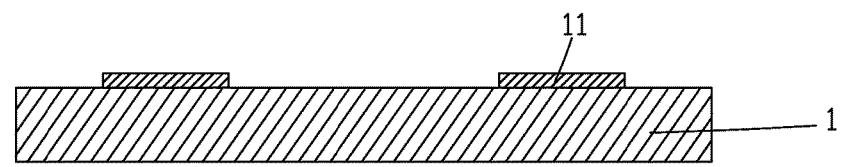
FIG. 4 is a diagram of the step 2 in the manufacture method of the flexible liquid crystal panel according to the present invention.

As shown in FIG. 4, the comb pixel electrodes 11 are alternately spaced and aligned on the horizontal direction to generate a horizontal electric field. The comb pixel electrodes 11 are transparent ITO electrodes.

Figure 5:
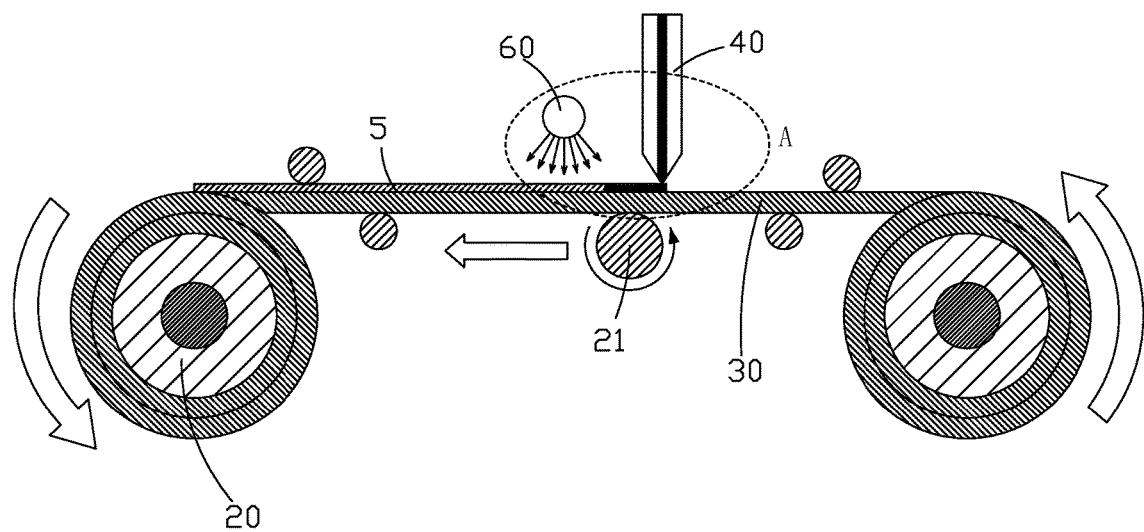
FIG. 5 is a diagram of the step 3 and step 4 in the manufacture method of the flexible liquid crystal panel according to the present invention.
Figure 6:
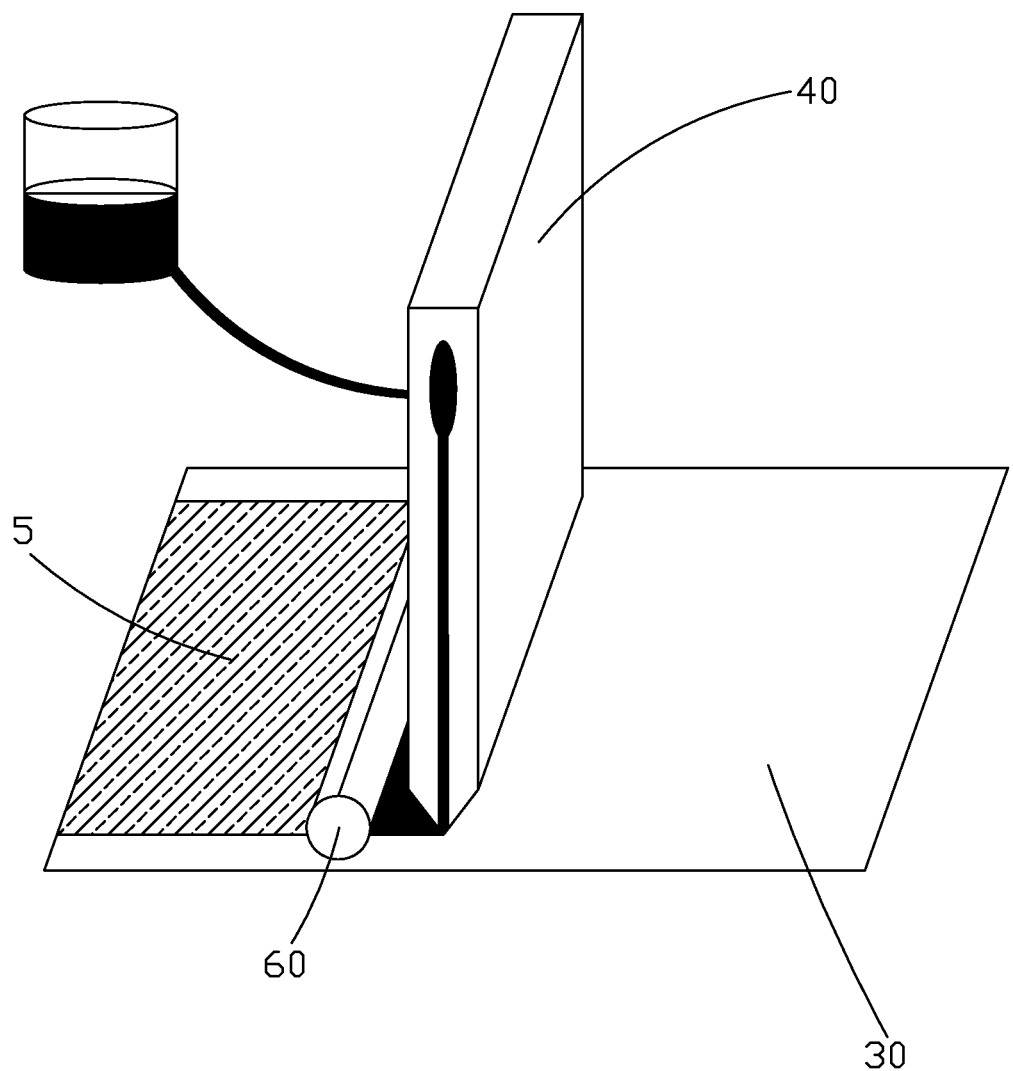
FIG. 6 is a stereo diagram of A section corresponding to FIG. 5.
Figure 7:
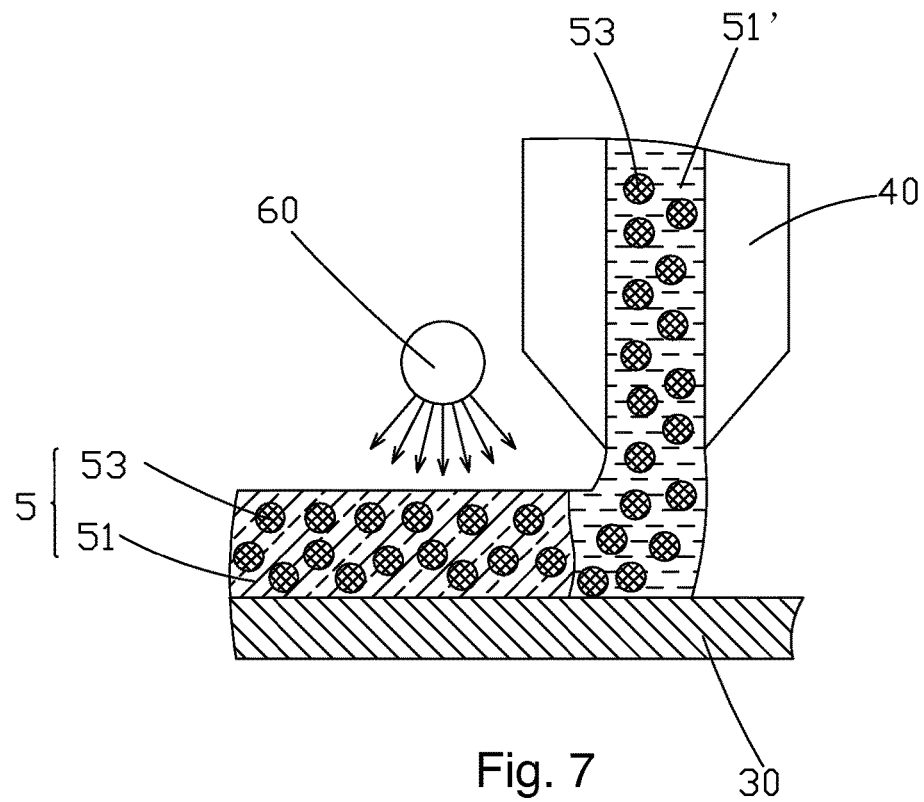
FIG. 7 is an enlarged diagram of A section corresponding to FIG. 5.
Figure 8:
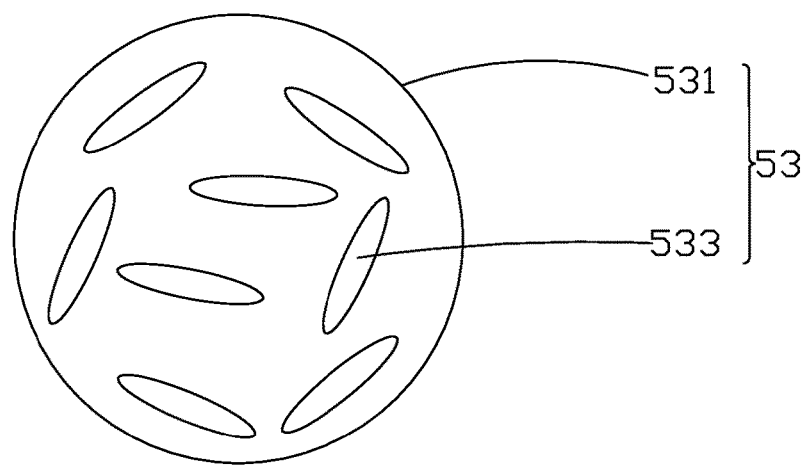
FIG. 8 is a diagram of a liquid crystal micro capsule shown in FIG. 7.

After the manufacture of the comb pixel electrodes 11, the gate line, the data line, the TFT and the color filter layer are accomplished, the glass is removed.

step 3, referring to FIG. 5, providing a flexible carrier 30, and positioning the flexible carrier 30 on a delivery wheel 12 of a roll-to-roll equipment, and the length of the flexible carrier 30 is long enough for that two ends are respectively rolled to two roll shafts 20 of the roll-to-roll equipment, and a certain distance is between the two roll shafts 20 along the horizontal direction, and a slit nozzle 40 is vertically located right above the flexible carrier 30, and the open direction of the slit nozzle 40 is toward the flexible carrier 30 with a certain space between the flexible carrier 30, and a UV lamp 60, which is parallel with the flexible carrier 30 is located at one side of the slit nozzle 40, and the UV lamp 60 is also located with a certain space from the flexible carrier 30.

The flexible carrier 30 is transparent and flexible. Preferably, the flexible carrier 30 is a plastic carrier.

step 4, referring from FIG. 5 to FIG. 8, driving the roll shafts 20 and the delivery wheel 21 to rotate the flexible carrier 30 to move along with the slit nozzle 40 toward the UV lamp 60, and from one roll shaft 20 to the other roll shaft 20, and continuously coating the mixture of the sealant 51' and the liquid crystal micro capsules 53 on the flexible carrier 30 via the slit nozzle 40, and meanwhile, implementing UV irradiation with the UV lamp 60 to the sealant 51' for occurring polyreaction and solidification to become a polymeric layer 51, and the liquid crystal micro capsules 53 are distributed in the polymeric layer 51 to acquire a polymer/liquid crystal mixture layer 5. The polymer/liquid crystal mixture layer 5 is manufactured by roll-to-roll way. The manufacture process efficiency is enormously promoted.

Specifically, the sealant 51' contains polymeric monomers. The polymeric monomers can generate polyreaction to form solid, well transparent substance of high molecule, which can be but not restricted to be: one or a combination of acrylate and derivatives thereof, methacrylate and derivatives thereof, styrene and derivatives thereof, epoxy resin and aliphatics epoxy curing agent.

The liquid crystal micro capsule 53 comprises a hard shell 531 and a plurality of liquid crystal molecules 533 wrapped in the hard shell 531. The hard shell 531 is constructed by polymer which has already been solidified. Furthermore, the liquid crystal micro capsules 53 appear to be spherical, and the diameters are 20 nm-200 nm.

Figure 9:
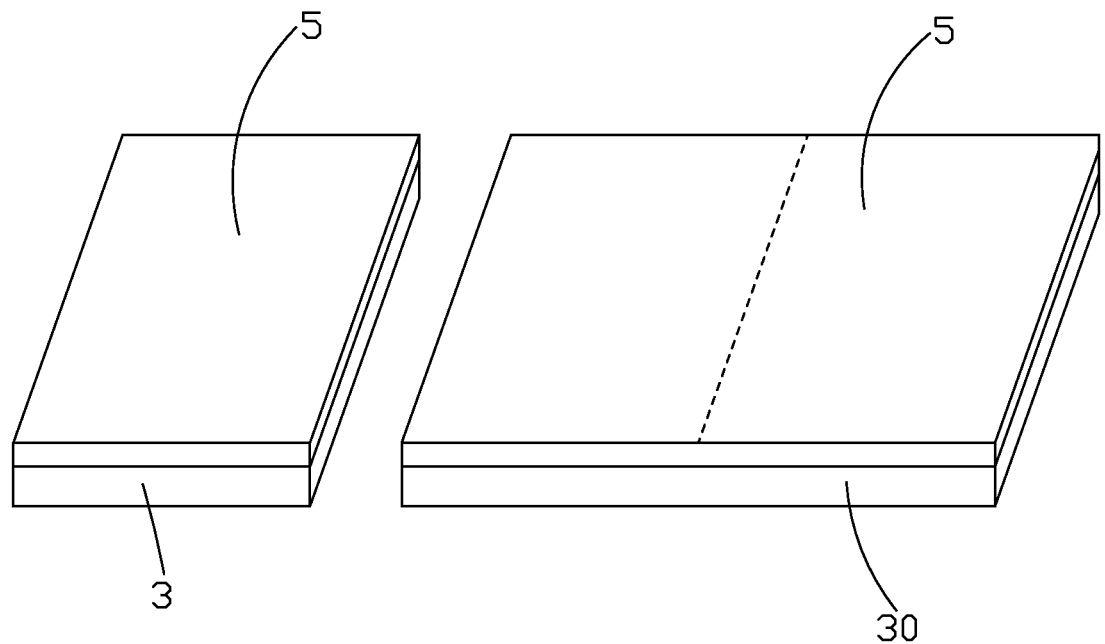
FIG. 9 is a diagram of the step 5 in the manufacture method of the flexible liquid crystal panel according to the present invention.

After the step 4 is accomplished, the plurality of liquid crystal molecules 533 are aligned in random, and surrounded by the polymeric layer 51 in a form of liquid crystal micro capsule 53, and different liquid crystal micro capsules 53 are independent among one another. The large area flow of liquid crystal material will not occur.

step 5, as shown in FIG. 9, cutting the composite layer of the flexible carrier 30 and the polymer/liquid crystal mixture layer 5 to obtain a plurality of second flexible substrates 3.

A dimension of the second flexible substrate 3 is adaptable for a dimension of the first flexible substrate 1.

Figure 10:
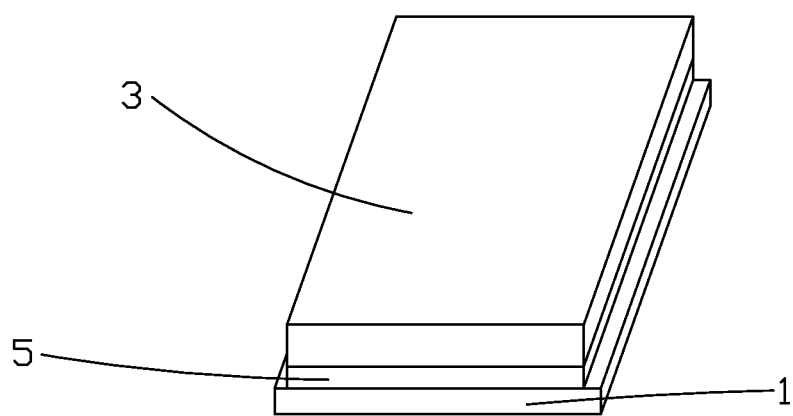
FIG. 10 is a diagram of the step 6 in the manufacture method of the flexible liquid crystal panel according to the present invention.
Figure 11:
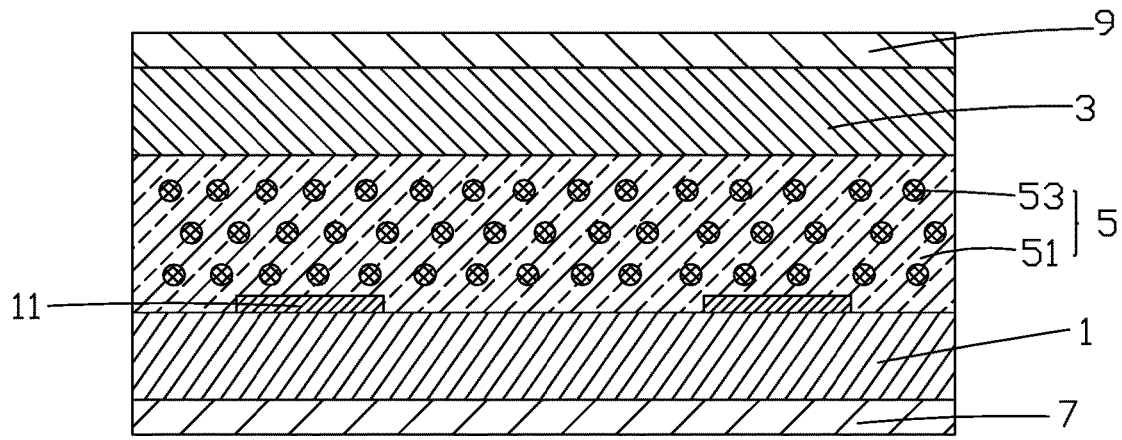
FIG. 11 is a diagram of the step 7 in the manufacture method of the flexible liquid crystal panel according to the present invention.

The second flexible substrate 3 is preferably to be a plastic substrate.

step 6, as shown in FIG. 10, laminating the first flexible substrate 1 and the second flexible substrate 3, and curing the joint adhesive between the two flexible substrates to package the polymer/liquid crystal mixture layer 5 between the first flexible substrate 1 and the second flexible substrate 3.

step 7, as shown in FIG. 11, laminating a lower polarizer 7 on a lower surface of the first flexible substrate 1, and laminating an upper polarizer 9 on an upper surface of the second flexible substrate 3.

Figure 16:
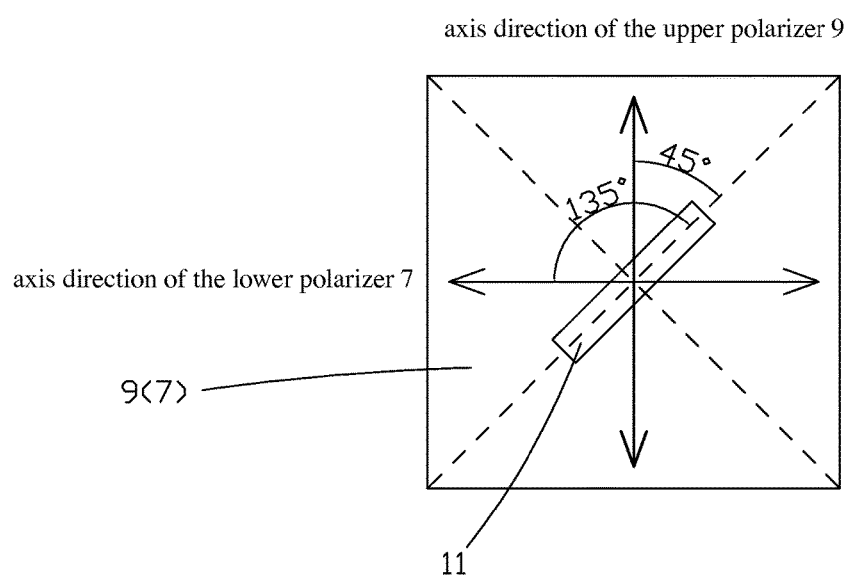
FIG. 16 is a diagram showing angle relationships among the axis directions of the upper, lower polarizers and the comb pixel electrodes in the flexible liquid crystal panel according to the present invention.

As shown in FIG. 16, the axis directions of the upper polarizer 9 and the lower polarizer 7 are mutually perpendicular, and respectively tilted relative to the comb pixel electrodes 11. Preferably, the axis directions of the upper polarizer 9 and the lower polarizer 7 respectively form a 45 degree include angle and a 135 degree included angle with the comb pixel electrodes 11. The included angles between the long axis of the liquid crystals and the upper polarizer 9, the lower polarizer 7 are respectively 45 degree and 135 degree to realize higher light transmission rate after the voltage is applied to the comb pixel electrodes 11 to generate a horizontal electric field to align the liquid crystal molecules 533 in the same direction.

Thus, the manufacture of the flexible liquid crystal panel is accomplished. The large area flow of liquid crystal material will not occur, which can eliminate the issue of the uneven cell gap in a liquid crystal layer of a bent liquid crystal panel according to prior art, and allow the liquid crystal panel adaptable for flexible display.

Please refer from FIG. 12 to FIG. 16. On the basis of the aforesaid manufacture method of a flexible liquid crystal panel, the present invention further provides a flexible liquid crystal panel. The flexible liquid crystal panel comprises a first flexible substrate 1, a second flexible substrate 3 oppositely located to the first flexible substrate 1, a polymer/liquid crystal mixture layer 5 located between the first flexible substrate 1 and the second flexible substrate 3, a lower polarizer 7 located at a lower surface of the first flexible substrate 1 and an upper polarizer 9 located at a upper surface of the second flexible substrate 3.

Both the first flexible substrate 1 and the second flexible substrate 3 are transparent and flexible. Preferably, both the first flexible substrate 1 and the second flexible substrate 3 are plastic substrates. The comb pixel electrodes 11, gate lines, data lines, TFTs and a color filter layer are formed on the first flexible substrate 1, i.e. the first flexible substrate 1 is equivalent to a TFT substrate located with the color filter layer.

The polymer/liquid crystal mixture layer 5 comprises a polymeric layer 51 and liquid crystal micro capsules 53 distributed in the polymeric layer 51. The liquid crystal micro capsule 53 comprises a hard shell 531 and a plurality of liquid crystal molecules 533 wrapped in the hard shell 531. The hard shell 531 is constructed by polymer which has already been solidified. In the polymer/liquid crystal mixture layer 5, the liquid crystal molecules 533 are surrounded by the polymeric layer 51 in a form of liquid crystal micro capsule 53, and different liquid crystal micro capsules 53 are independent among one another. The large area flow of liquid crystal material will not occur, which can eliminate the issue of the uneven cell gap in a liquid crystal layer of a bent liquid crystal panel according to prior art, and allow the liquid crystal panel adaptable for flexible display.

The comb pixel electrodes 11 are alternately spaced and aligned on the horizontal direction. The axis directions of the upper polarizer 9 and the lower polarizer 7 are mutually perpendicular, and respectively tilted relative to the comb pixel electrodes 11. Preferably, the axis directions of the upper polarizer 9 and the lower polarizer 7 respectively form a 45 degree include angle and a 135 degree included angle with the comb pixel electrodes 11.

Figure 12:
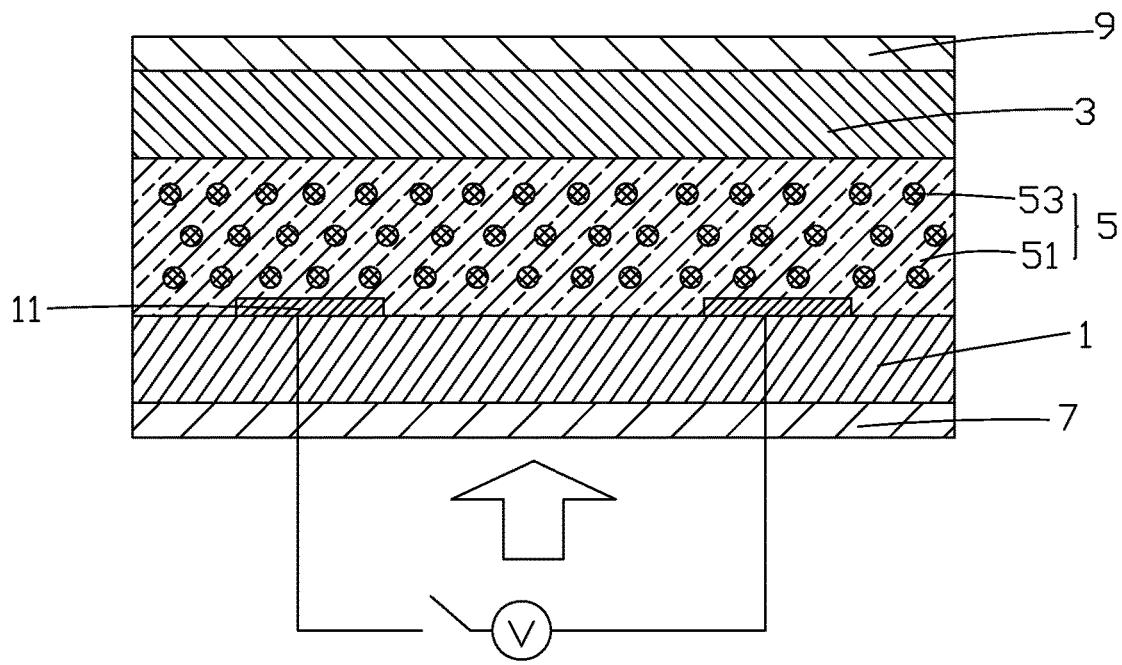
FIG. 12 is a diagram of the flexible liquid crystal panel according to the present invention in non electrified state.
Figure 13:
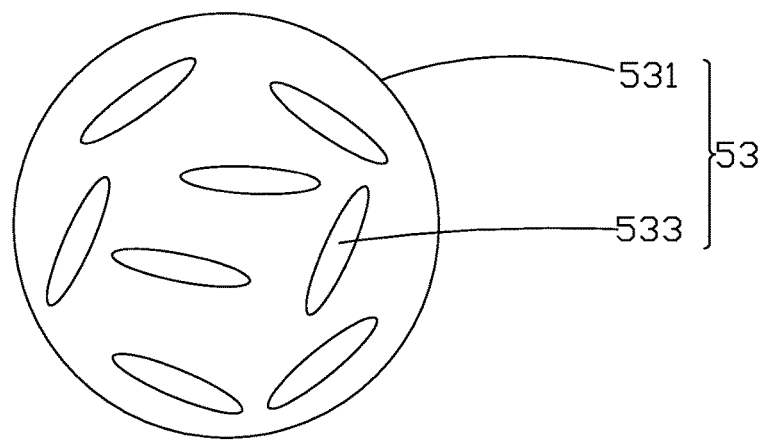
FIG. 13 is an alignment condition diagram of liquid crystal molecules in the liquid crystal micro capsule shown in FIG. 12.
Figure 14:
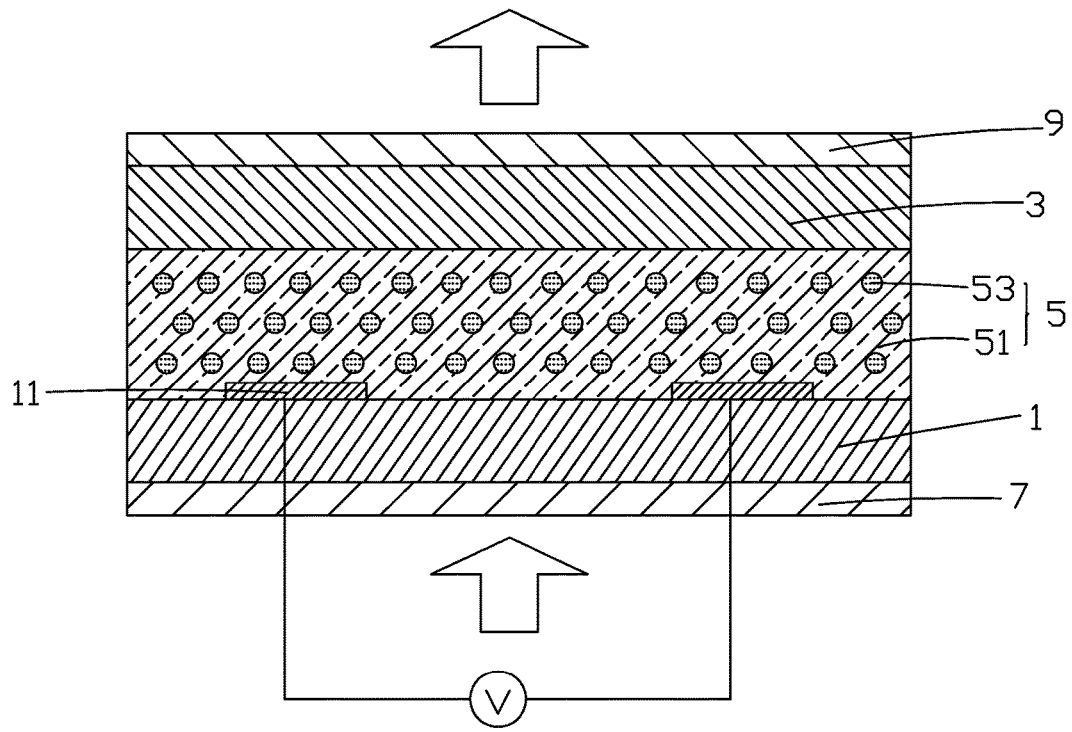
FIG. 14 is a diagram of the flexible liquid crystal panel according to the present invention in electrified state.
Figure 15:
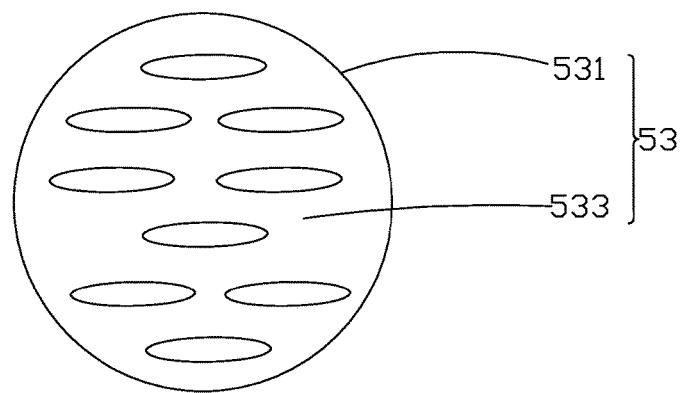
FIG. 15 is an alignment condition diagram of liquid crystal molecules in the liquid crystal micro capsule shown in FIG. 14.

Please refer to FIG. 12 and FIG. 13 at the same time. In non electrified state, the liquid crystal molecules 533 in the liquid crystal micro capsule 53 are disorderly aligned in random. The light enters the polymer/liquid crystal mixture layer 5 passing through the lower polarizer 7, and no phase difference occurs. The light cannot pass through the upper polarizer 9, which the axis thereof is perpendicular with the lower polarizer 7. The flexible liquid crystal panel appears to be dark. Please refer to FIG. 14 and FIG. 15 at the same time. In electrified state, the comb pixel electrodes 11 generate a horizontal electric field. The plurality of liquid crystal molecules 533 in the liquid crystal micro capsule 53 occur to be twisted under the function of the horizontal electric field, and re-aligned in the same direction. After the light enters the polymer/liquid crystal mixture layer 5 through the lower polarizer 7, a great significant phase is generated, and then the light can pass through the upper polarizer 9. Now, the flexible liquid crystal panel appears to be bright for performing display. As shown in FIG. 16, the axis directions of the upper polarizer 9 and the lower polarizer 7 are set to respectively have a 45 degree include angle and a 135 degree included angle with the comb pixel electrodes 11. After the voltage is applied, the orientation of the liquid crystal molecules 533 in the liquid crystal micro capsule 53 is determined according to the direction of the electric field. The included angles between the long axis of the liquid crystals and the upper polarizer 9, the lower polarizer 7 are respectively 45 degree and 135 degree to make the light transmission rate higher.

In conclusion, the manufacture method of the flexible liquid crystal panel according to the present invention is, continuously coating a mixture of sealant and liquid crystal micro capsules in roll-to-roll, and meanwhile implementing UV irradiation to the sealant for occurring polyreaction and solidification to become a polymeric layer, and the liquid crystal micro capsules are distributed in the polymeric layer to acquire a polymer/liquid crystal mixture layer. The liquid crystal molecules are surrounded by the polymeric layer in a form of liquid crystal micro capsule, and different liquid crystal micro capsules are independent among one another. Therefore, the large area flow of liquid crystal material will not occur, which can eliminate the issue of the uneven cell gap in a liquid crystal layer of a bent liquid crystal panel according to prior art, allow the liquid crystal panel adaptable for flexible display and promote the efficiency of the manufacture process. The flexible liquid crystal panel of the present invention comprises the polymer/liquid crystal mixture layer, and the liquid crystal molecules are surrounded by the polymeric layer in the form of liquid crystal micro capsule, and different liquid crystal micro capsules are independent among one another. Therefore, the large area flow of liquid crystal material will not occur, which can eliminate the issue of the uneven cell gap in a liquid crystal layer of a bent liquid crystal panel according to prior art, and allow the liquid crystal panel adaptable for to flexible display.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A manufacture method of a flexible liquid crystal panel, comprising first manufacturing comb pixel electrodes, gate lines, data lines, TFTs and a color filter layer on a first flexible substrate; continuously coating a mixture of sealant and liquid crystal micro capsules on a flexible carrier in roll-to-roll, and meanwhile implementing UV irradiation to the sealant for occurring polyreaction and solidification to become a polymeric layer, wherein the liquid crystal micro capsules are distributed in the polymeric layer to acquire a polymer/liquid crystal mixture layer; cutting a composite layer of the flexible carrier and the polymer/liquid crystal mixture layer to obtain a second flexible substrate; then, laminating the first flexible substrate and the second flexible substrate to package the polymer/liquid crystal mixture layer between the first flexible substrate and the second flexible substrate; finally, laminating an upper polarizer and a lower polarizer.

2. The manufacture method of the flexible liquid crystal panel according to claim 1, comprising steps of:
   step 1, providing the first flexible substrate and laminating the first flexible substrate to a glass;
   step 2, manufacturing the comb pixel electrodes, the gate lines, the data lines, the TFTs and the color filter layer on the first flexible substrate by a microlithography process, and then removing the glass;
   step 3, providing a flexible carrier, positioning the flexible carrier on a delivery wheel of a roll-to-roll equipment, and two ends of the flexible carrier are respectively rolled to two roll shafts of the roll-to-roll equipment, and a slit nozzle is vertically located right above the flexible carrier, and a UV lamp, which is parallel with the flexible carrier is located at one side of the slit nozzle;
   step 4, driving the roll shafts and the delivery wheel to rotate the flexible carrier to move along with the slit nozzle toward the UV lamp, and from one roll shaft to the other roll shaft, and continuously coating the mixture of the sealant and the liquid crystal micro capsules on the flexible carrier via the slit nozzle, and meanwhile, implementing UV irradiation with the UV lamp to the sealant for occurring polyreaction and solidification to become a polymeric layer, and the liquid crystal micro capsules are distributed in the polymeric layer to acquire a polymer/liquid crystal mixture layer;

the sealant contains polymeric monomers; the liquid crystal micro capsule comprises a hard shell and a plurality of liquid crystal molecules wrapped in the hard shell;

step 5, cutting the composite layer of the flexible carrier and the polymer/liquid crystal mixture layer to obtain the second flexible substrate, and a dimension of the second flexible substrate is adaptable for a dimension of the first flexible substrate;

step 6, laminating the first flexible substrate and the second flexible substrate to package the polymer/liquid crystal mixture layer between the first flexible substrate and the second flexible substrate;

step 7, laminating a lower polarizer on a lower surface of the first flexible substrate, and laminating an upper polarizer on an upper surface of the second flexible substrate;

the axis directions of the upper polarizer and the lower polarizer are mutually perpendicular, and respectively tilted relative to the comb pixel electrodes.

3. The manufacture method of the flexible liquid crystal panel according to claim 2, wherein the first flexible substrate is a plastic substrate, and the flexible carrier is a plastic carrier, and the second flexible substrate is a plastic substrate.

4. The manufacture method of the flexible liquid crystal panel according to claim 2, wherein the comb pixel electrodes are alternately spaced and aligned on the horizontal direction.

5. The manufacture method of the flexible liquid crystal panel according to claim 2, wherein the liquid crystal micro capsules appear to be spherical, and the diameters are 20 nm-200 nm.

6. The manufacture method of the flexible liquid crystal panel according to claim 2, wherein the axis directions of the upper polarizer and the lower polarizer respectively form a 45 degree included angle and a 135 degree included angle with the comb pixel electrodes.

7. The manufacture method of the flexible liquid crystal panel according to claim 2, wherein the polymeric monomer is one or a combination of acrylate and derivatives thereof, methacrylate and derivatives thereof, styrene and derivatives thereof, epoxy resin and aliphatics epoxy curing agent.

* * * * *